H. C. SCHANZE, Sr.
DEVICE FOR AERIAL NAVIGATION.
APPLICATION FILED NOV. 25, 1908.
956,648.
Patented May 3, 1910.
2 SHEETS—SHEET 1.
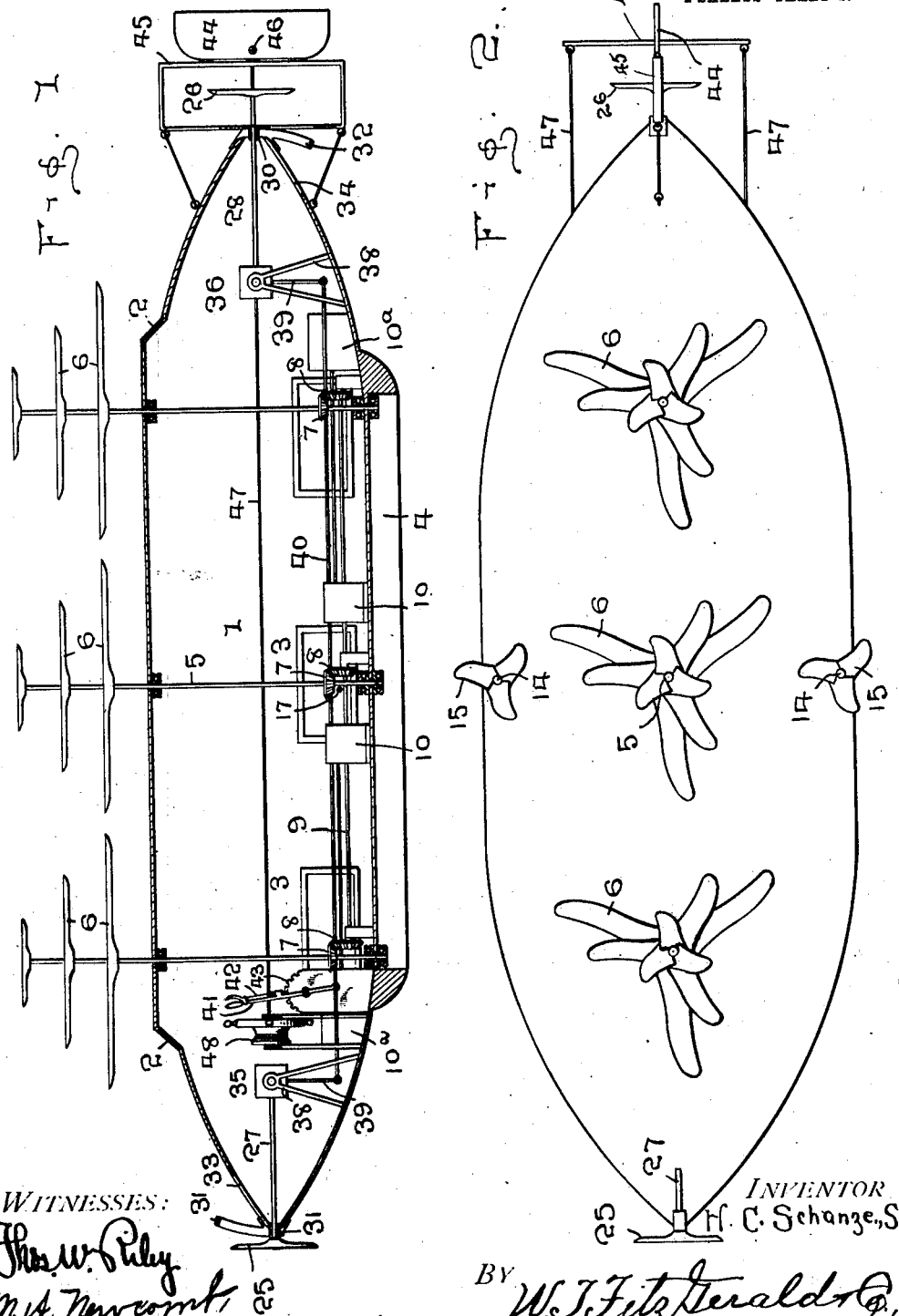
WITNESSES:
INVENTOR
H. C. Schanze, Sr.
BY W. J. FitzGerald
Attorney H. C. SCHANZE, Sr.
DEVICE FOR AERIAL NAVIGATION.
APPLICATION FILED NOV. 25, 1908.
956,648.
Patented May 3, 1910.
2 SHEETS—SHEET 2.
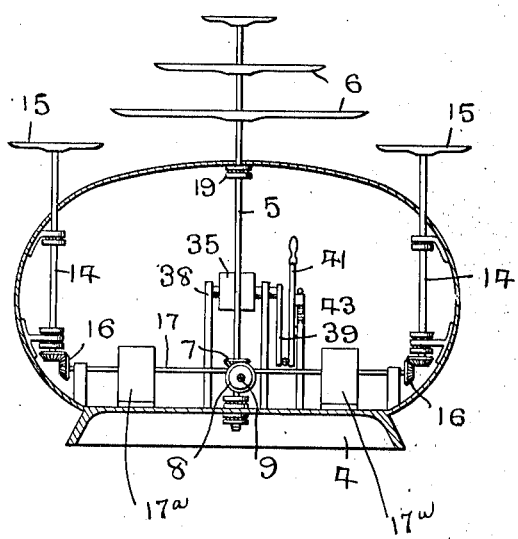
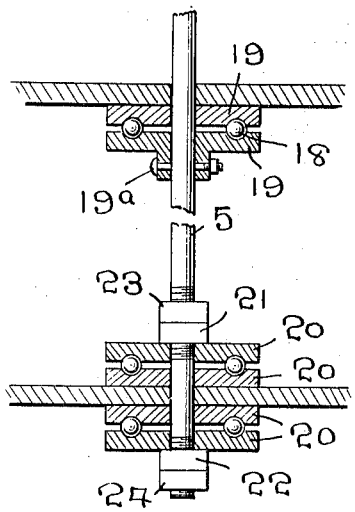
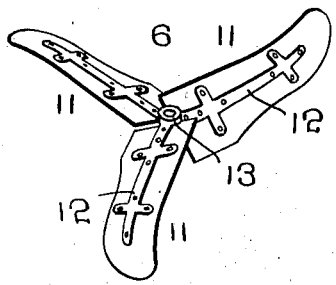
WITNESSES:
INVENTOR
H. C. Schanze, Sr.
BY
Attorneys.

UNITED STATES PATENT OFFICE.

HENRY C. SCHANZE, SR., OF CAMDEN, NEW JERSEY.

DEVICE FOR AERIAL NAVIGATION.

956,648.   Specification of Letters Patent.   Patented May 3, 1910.

Application filed November 25, 1908. Serial No. 464,345.

*To all whom it may concern:*

Be it known that I, HENRY C. SCHANZE, Sr., a citizen of the United States, residing at Camden, in the county of Camden and State of New Jersey, have invented certain new and useful Improvements in Devices for Aerial Navigation; and I do hereby declare the following to be a full, clear, and exact description of the invention, such as will enable others skilled in the art to which it appertains to make and use the same.

My invention relates to new and useful improvements in devices for aerial navigation, particularly of the propeller type.

As indicated, it has for its object to provide means for making practical, aerial or overhead navigation, which shall be highly buoyant and under ready and effective control of the operator and capable of guarding against precipitous or uncontrollable movement.

Said invention also has for its object to carry out the aforesaid ends in a simple, effective and economical manner.

Other objects and advantages will be hereinafter referred to and more particularly pointed out in the claims.

In the accompanying drawings which are made a part of this application, Figure 1 is a longitudinal section of the invention with parts thereof in side elevation. Fig. 2 is a plan view of the same. Fig. 3 is a vertical transverse section thereof, with parts in side view. Fig. 4 is a broken or fractional sectional view upon an enlarged scale disclosing more especially frictional bearings for the propeller shafts, and, Fig. 5 is a detached perspective view of one of the propellers.

In describing the invention in detail, reference will be had to the accompanying drawings forming part of this specification, wherein like characters of reference denote corresponding parts in the several views.

In carrying out my invention, I provide a car or housing 1, preferably having its frame work formed from alloyed aluminum and the shell thereof formed of aluminum, said frame work and shell being preferably of 1¼ inches and ⅛ inch in thickness, respectively. Said car or inclosure 1 is provided with observation windows 2 in its upper portion, fore and aft, filled in preferably with extra heavy glass, and formed in the lower portion of said car near the bottom, are additional preferably slide-covered openings 3, one at each end, or fore and aft and the third about centrally thereof in both sides of the car, the slides thereof being formed with air-tight compression joints. The under side of said car or inclosure is formed into a downwardly opening compartment 4, designed to form an air cushion to aid in controlling the descent of the car by the action of the air cushion formed in the compartment 4.

A number of vertical shafts 5 are arranged at suitable intervals apart within the car or housing 1 and extend thereabove, such extending portions being equipped with propeller blades 6, the lower ends of the shafts 5 being suitably intergeared as at 7 and 8, with a horizontal shaft 9, suitably journaled in said housing or car near its floor, said horizontal shaft being driven or receiving its motion from suitable motors 10 arranged in the bottom of said housing or car and which are of suitable horse power, the preferred type, being the La Antoinette not shown. Also arranged in said housing or car 1 upon the floor thereof are suitable fuel or oil-holding tanks 10ᵃ for replenishing the motors with fuel when necessary.

The propellers 6 are each formed preferably of three blades 11 preferably of reinforced aluminum or wood set at the requisite angles in aluminum frames 12 radiating from a central tubular member 13 also of aluminum, the same being braced and strengthened against possibility of accidental breakage. The propellers 6 of each shaft are arranged in a graduated series of three, the top one being the smallest, the purpose of which is thought to be obvious, said propellers having their angular positions of such arrangement as to coöperate in utilizing the mutual action of said propellers upon the air. An additional or supplemental like arrangement of shafts and propellers 14 and 15, but of less lifting and driving capacity, is arranged about centrally of the housing or car and laterally of the central or main shaft and propellers with their shafts geared as at 16 to a horizontal shaft 17, each suitably controlled from a supplemental motor 17ᵃ, and which additional propellers may be brought into action in event of the failure of the main propellers or any one of them to operate.

The propeller shafts 5, as also the shafts of the supplemental propellers, have their bearings provided with balls 18 interposed between bearing plates 19, said bearing plates having said shafts passing therethrough, as shown in Fig. 4, the lower one of the upper pair of plates being bolted or otherwise secured to said shafts, as at 19ª, the plates or members 20 of said bearings being arranged in pairs above and below the floor of the car 1 and said shafts 5 being held to said pairs of bearing plates by nuts 21 and 22 screwed upon said shafts, said nuts being held in effective position by jam nuts 23 and 24. Of course, it will be understood that this arrangement of bearing plates and balls may be substituted by any other suitable form of bearing without affecting the spirit of my invention and therefore be within the range thereof. It will be understood that the bearings may be filled in with brass and Babbitt metal, as is common for this purpose.

Arranged at the forward end of the housing is a propeller 25 and at the rear end of the car or housing 1 is also arranged a like propeller 26 forming in connection with other parts presently disclosed what may be termed gyroscopes, both of which propellers are adapted, by means later described, to be adjusted or moved, the forward one in an upward angular position and the other to be moved in a downward angular position for varying and controlling the angle of the movement of the machine in either an upward or downward direction, as will be readily appreciated. Said propellers 25 and 26 are carried by shafts 27 and 28, having their journals or bearings 29 and 30 received by the quadrants 31 and 32, respectively, suitably fixed to said housing and projecting downwardly and upwardly therefrom, respectively, said quadrants providing for guiding and controlling the angular movement imparted to said shafts and said propellers 25 and 26. Said housing is provided at its forward and rear ends, in its upper and lower surfaces, with slots or openings 33 and 34, respectively, to permit of the aforesaid movement of the shafts 27 and 28, as is apparent. Said propellers of the gyroscopes as thus constructed may have a driving speed upwardly of one hundred and fifty to three hundred revolutions per minute and may have a lifting speed from one hundred to three hundred revolutions per minute.

The motor casings, which are hung or pivoted in suitable supports 38 arranged in the housing or car, have connected thereto pendent arms 39, which are connected together by means of a common rod 40 adapted to be actuated by a manually actuated lever 41 suitably equipped with a housing detent 42 engaging a rack 43 secured to the floor of the housing or car. It will, therefore, be noted that by suitably actuating the lever 41, the shafts 27 and 28, together with the propellers 25 and 26 may be simultaneously adjusted or moved into the positions above ascribed to the latter and thus held, as may be desired.

The car or housing 1 is also provided at its rear end with a rudder 44 having pivotal or hinge connection, so as to swing horizontally, to a frame or skeleton member 45 to provide for suitably steering the device in its flight or movement through the air, said rudder having connected thereto a transverse rod 46, passing about centrally therethrough, said rod having connected thereto at its ends, lines or cables 47 carried forward and suitably coiled or wound around a pilot wheel 48 suitably arranged at the forward end of the machine and under the control of the operator. It is also noted that the gearing herein described may be made of solid alloyed aluminum, as also the ball bearings above described.

I claim:

1. A device of the character described, comprising a housing, propellers arranged at the forward and rear ends of said housing, shafts carrying said propellers, quadrants secured to the ends of said housing, one of said quadrants extending upwardly and the other quadrant extending downwardly, with journals supporting said shafts arranged for movement in said quadrants in opposite arcs in a vertical direction, motors for actuating said shafts, a common connecting means between the casing of said motors, means for adjusting said propellers, said motor casings being pivotally supported in position.

2. A device of the character described, comprising a car, propellers arranged at the forward and rear ends of said car, shafts carrying said propellers, quadrants arranged at the ends of said car and extending in opposite arcs in a vertical direction, journals for said shafts arranged in said quadrants, motors having their casings pivotally mounted in said car, said motors being adapted to actuate the shafts of said propellers, pendent bars connected to the casings of said motors, and common connecting means between said pendants, and adjusting means for effecting simultaneously the adjustment of the castings of said motors, accordingly effecting the disposition of said propellers at different angles to the car.

In testimony whereof I have signed my name to this specification in the presence of two subscribing witnesses.

HENRY C. SCHANZE, Sr.

Witnesses:
SAMUEL BENNETT,
ALEXANDER E. BENNETT.